United States Patent
Frederiksen et al.

(10) Patent No.: US 12,082,258 B2
(45) Date of Patent: Sep. 3, 2024

(54) BASE STATION CONFIGURED HYBRID RANDOM ACCESS PROCEDURE

(71) Applicant: Nokia Technologies Oy, Espoo (FI)

(72) Inventors: Frank Frederiksen, Klarup (DK); Zhe Luo, Shanghai (CN); Tao Tao, Shanghai (CN); Jianguo Liu, Shanghai (CN)

(73) Assignee: NOKIA TECHNOLOGIES OY, Espoo (FI)

(*) Notice: Subject to any disclaimer, the term of this patent is extended or adjusted under 35 U.S.C. 154(b) by 324 days.

(21) Appl. No.: 17/268,523

(22) PCT Filed: Aug. 22, 2018

(86) PCT No.: PCT/CN2018/101812
§ 371 (c)(1),
(2) Date: Feb. 15, 2021

(87) PCT Pub. No.: WO2020/037569
PCT Pub. Date: Feb. 27, 2020

(65) Prior Publication Data
US 2021/0227592 A1   Jul. 22, 2021

(51) Int. Cl.
*H04W 74/0833* (2024.01)
*H04W 74/0808* (2024.01)

(52) U.S. Cl.
CPC ... *H04W 74/0833* (2013.01); *H04W 74/0825* (2013.01)

(58) Field of Classification Search
CPC ............... H04W 74/0825; H04W 74/0833
See application file for complete search history.

(56) References Cited

U.S. PATENT DOCUMENTS

| 2016/0309518 A1* | 10/2016 | Patel ................. H04W 74/0891 |
| 2018/0110075 A1 | 4/2018 | Ly et al. |
| 2018/0124724 A1 | 5/2018 | Tsai et al. |
| 2018/0205516 A1 | 7/2018 | Jung et al. |

(Continued)

FOREIGN PATENT DOCUMENTS

| CN | 101999219 A | 3/2011 |
| CN | 102685892 A | 9/2012 |

(Continued)

OTHER PUBLICATIONS

Extended European Search Report received for corresponding European Patent Application No. 18931268.9, dated Mar. 14, 2022, 8 pages.

(Continued)

*Primary Examiner* — Nizam U Ahmed
(74) *Attorney, Agent, or Firm* — SQUIRE PATTON BOGGS (US) LLP

(57) ABSTRACT

A method comprises configuring, by a base station, a device with a first mode of performing random access procedure. The method includes configuring the device with a second mode of performing random access procedure. The device is configured to access either the first mode of performing random access procedure or the second mode of performing random access procedure. The method also includes configuring an availability of the second mode of performing random access procedure.

20 Claims, 5 Drawing Sheets

(56) References Cited

U.S. PATENT DOCUMENTS

| | | | | |
|---|---|---|---|---|
| 2018/0234890 A1* | 8/2018 | Shih | | H04W 60/00 |
| 2019/0132882 A1* | 5/2019 | Li | | H04W 74/0833 |
| 2019/0357267 A1* | 11/2019 | Martin | | H04W 74/0833 |
| 2021/0274555 A1* | 9/2021 | Alfarhan | | H04W 74/0808 |

FOREIGN PATENT DOCUMENTS

| | | |
|---|---|---|
| CN | 108076534 A | 5/2018 |
| CN | 108282895 A | 7/2018 |
| WO | 2018/085726 A1 | 5/2018 |

OTHER PUBLICATIONS

International Search Report and Written Opinion received for corresponding Patent Cooperation Treaty Application No. PCT/CN2018/101812, dated May 20, 2019, 9 pages.

"2-Step Random Access Procedure in NR", 3GPP TSG-RAN WG2 NR Ad Hoc, R2-1700237, Agenda: 3.2.1.4, InterDigital Communications, Jan. 17-19, 2017, pp. 1-3.

"Consideration on Use Cases of 2-Step Rach Procedure", 3GPP TSG-RAN WG2 Meeting #NR Ad Hoc, R2-1700356, Agenda: 3.2.1.4, ASUSTeK, Jan. 17-19, 2017, 4 pages.

Notice of the Result of Substantive Examination Pursuant to Article 62(3) of Indonesian Patent Law No. 13/2016 Issued in corresponding Indonesian Patent Application No. P00202102068 dated Mar. 29, 2023, with English translation thereof.

Indonesian Office Action issued in corresponding Indonesian Patent Application No. P00202102068 on Oct. 16, 2023.

Chinese Office Action issued in corresponding Chinese Patent Application No. 201880098108.5 on Nov. 29, 2023.

Chinese Office Action issued in corresponding Chinese Patent Application No. 201800981085 on May 26, 2024.

3GPP TSG-RAN WG1 #87, Reno, USA Nov. 14-18, 2016, R1-1612299, "Random Access Principles for New Radio", Nokia, Alacatel-Lucent Shanghai Bell, 4 pages.

3GPP TSG RAN WG1 Meeting AH 1801, Vancouver, Canada, Jan. 22-26, 2018, R1-1800727, "Physical Channel Design for 2-step RACH", Motorola Mobility, 4 pages.

\* cited by examiner

200 

210: gNB 170 broadcasts the configuration of preamble (Msg1) in RMSI

220: UE 110 randomly selects a preamble from a configured set and transmits this random access preamble (Msg1) to the gNB 170 based on the configuration 230: gNB receives the preamble and responds with random access response 240: UE obtains the RAR and transmits Msg3 based on the UL grant in the RAR 250: gNB receives Msg3 and sends Msg4 to finish contention resolution

Fig. 2

300 

310: gNB broadcasts the configuration of Msg1+3 (including legacy Msg1 and Msg3) in RMSI. The UE obtains the configuration by receiving SSB and corresponding RMSI 320: UE sends Msg1+3 to the gNB based on the configuration 330: gNB receives Msg1+3 and responds with Msg2+4 (corresponding to a combination of Msg2 and Msg4, but not including the UL grant in Msg2) if it can decode Msg1+3 successfully

410: During initial access, all UEs will use the normal 4-step RACH procedure

420: The system (gNB and UE) may decide that the UE is eligible for low latency access to the cell 430: gNB provides a configuration of to the UE for using 2-step RACH for either RRC connection re-establishment or instant small data payload transmission without established RRC connection 440: UE performs 2-step RACH procedure based on configurations provided by the gNB and detection of a trigger provided by the gNB 450: In case it has traffic arriving that is not in the configured set of logical channels or logical channel groups, the UE defaults to normal 4-step RACH procedure

510: configure, through broadcast signaling, UE 110 with a first mode of performing random access procedure 520: configure, through device specific signaling, UE 110 with a second mode of performing random access procedure 530: limit availability of second mode of performing random access procedure

Fig. 5

BASE STATION CONFIGURED HYBRID RANDOM ACCESS PROCEDURE

RELATED APPLICATION

This application was originally filed as PCT Application No. PCT/CN2018/101812, filed on Aug. 22, 2018.

TECHNICAL FIELD

The teachings in accordance with the exemplary embodiments of this invention relate generally to Radio Standards including physical layer (PHY), Medium access control (MAC), Radio Link Control (RLC), Radio Resource Control (RRC), etc., and particularly, to downlink control channel transmission and reception.

BACKGROUND

In LTE or the current Rel-15 NR, only a 4-step RACH procedure is supported. However, the 4-step RACH procedure suffers many uncertainties and large latency due to LBT failures on unlicensed spectrum. At a recent 3GPP RAN1 meeting, proposals to support 2-step RACH procedure for unlicensed NR were made, in order to mitigate the issues caused by LBT failures.

Certain abbreviations that may be found in the description and/or in the Figures are herewith defined as follows:

| | |
|---|---|
| ACK | Acknowledgement |
| BPL | Beam Pair Link |
| DL | Downlink |
| gNB | 5G Enhanced Node B (Base station) |
| HARQ | Hybrid Automatic Repeat Request |
| IMSI | International Mobile Subscriber Identity |
| LBT | Listen Before Talk |
| LTE | long term evolution |
| MAC | Medium access control |
| MCS | Modulation and coding scheme |
| MEC | multi-access edge computing |
| MME | mobility management entity |
| Msg | Message |
| NACK | Negative acknowledgement |
| NCE | network control element |
| NR | New radio |
| NR-PDCCH | New radio Physical Downlink Control Channel |
| N/W | Network |
| OCC | Orthogonal Cover Code |
| PDCCH | Physical Downlink Control Channel |
| PDSCH | Physical Downlink Shared Channel |
| PHY | Physical |
| PRACH | Physical Random Access Channel |
| PRB | Physical Resource Block |
| RACH | Random Access Channel |
| RF | Radio Frequency |
| RMSI | remaining minimum system information |
| RNTI | Radio Network Temporary Identifier |
| RRC | Radio Resource Control |
| RS | Reference Signal |
| SSB | Synchronization Signal Block |
| TPC | Transmission Power Control |
| TXRU | Transceiver Unit |
| UE | User Equipment |
| UL | Uplink |
| 5G | Fifth generation mobile communication system |

SUMMARY

This section contains examples of possible implementations and is not meant to be limiting:

In accordance with one aspect, an example method comprises configuring, by a base station, a device with a first mode of performing random access procedure; configuring the device with a second mode of performing random access procedure, wherein the device is configured to access either the first mode of performing random access procedure or the second mode of performing random access procedure; and configuring an availability of the second mode of performing random access procedure.

In accordance with another aspect, an example apparatus comprises at least one processor; and at least one non-transitory memory including computer program code, the at least one memory and the computer program code may be configured to, with the at least one processor, cause the apparatus to: configure a device with a first mode of performing random access procedure; configure the device with a second mode of performing random access procedure, wherein the device is configured to access either the first mode of performing random access procedure or the second mode of performing random access procedure; and control an availability of the second mode of performing random access procedure.

In accordance with another aspect, an example apparatus comprises means for configuring a device with a first mode of performing random access procedure; means for configuring the device with a second mode of performing random access procedure, wherein the device is configured to access either the first mode of performing random access procedure or the second mode of performing random access procedure; and means for configuring an availability of the second mode of performing random access procedure.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 shows a method in accordance with example embodiments which may be performed by an apparatus;

FIG. 3 shows a method in accordance with example embodiments which may be performed by an apparatus;

FIG. 4 shows a method in accordance with example embodiments which may be performed by an apparatus; and FIG. 5 shows another method in accordance with example embodiments which may be performed by an apparatus.

DETAILED DESCRIPTION

Figure 1:
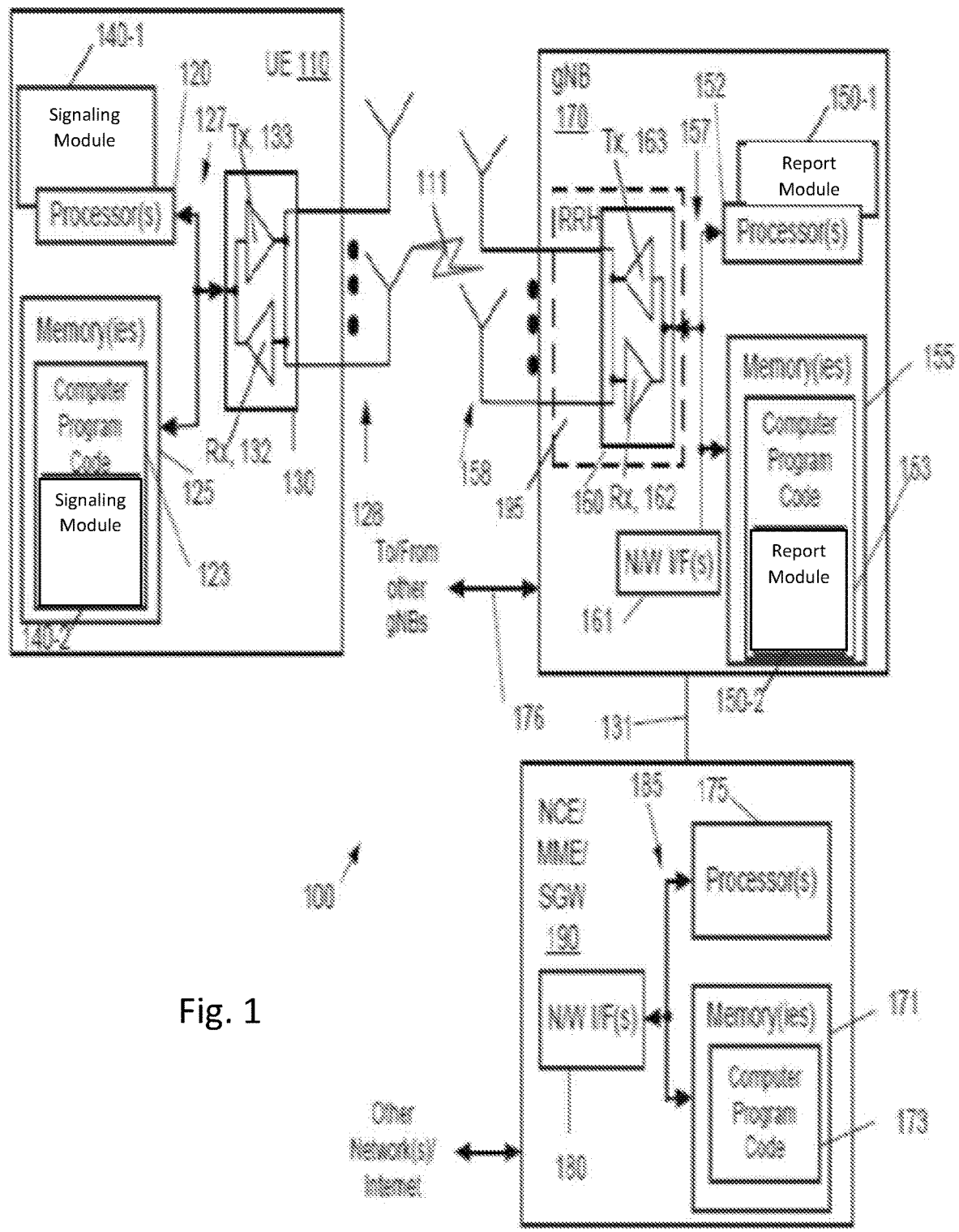
FIG. 1 is a block diagram of one possible and non-limiting example system in which the example embodiments may be practiced.

In the example embodiments as described herein a method and apparatus that provides a base station configured hybrid random access procedure is disclosed.

Turning to FIG. 1, this figure shows a block diagram of one possible and non-limiting example system in which the example embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The gNB (NR/5G Node B but possibly an evolved NodeB) 170 is a base station (e.g., for LTE, long term evolution, or for NR, New Radio) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a report module 150, comprising one of or both parts 150-1 and/or 150-2, which may be implemented in a number of ways. The report module 150 may be implemented in hardware as report module 150-1, such as being implemented as part of the one or more processors 152. The report module 150-1 may be implemented also as an integrated circuit or through other hardware such as a programmable gate array. In another example, the report module 150 may be implemented as report module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB. Each cell may contain one or multiple transmission and receiving points (TRPs).

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomous self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Example embodiments may be implemented in network backhaul. Example embodiments may also be implemented in relay nodes (for example, with regard to functions described herein below with respect to UE 110). Furthermore, in a multi-hop relay scenario, a radio network (RN), for example network 100, may implement functionality described with respect to gNB 170 herein below.

Having thus introduced one suitable but non-limiting technical context for the practice of the example embodiments of this invention, the example embodiments will now be described with greater specificity.

FIG. 2 is an example flow diagram 200 illustrating a method in accordance with example embodiments which may be performed by an apparatus or combination of apparatus, for example, a gNB 170 and UE 110 as described herein.

To ensure fair coexistence in unlicensed spectrum, example embodiments may include (or incorporate) a LBT mechanism used by UEs 110/gNBs 170 to evaluate whether the radio channel is available for use. Only in case the radio channel is evaluated to be sufficiently free from interference (LBT success), the UE 110/gNB 170 is allowed to transmit. The example embodiments may include (or incorporate) both a 4-step RACH procedure and a 2-step RACH procedure. For each step of the 4-step RACH procedure, the transmission suffers the risk of LBT failure (blocking). A LBT failure will typically cause increased latency, since a targeted transmission is blocked and a new transmission opportunity is required, and the entire procedure may need to be started all over or prolonged in case one of the steps in the access chain is missing.

The 2-step RACH procedure only involves two steps and may reduce the impact of LBT failure by reducing the overall number of transmissions from 4 to 2. Such reduction of transmission amount also reduces the amount of needed LBT actions, and there by lowers the probability of latency. However, the 2-step RACH procedure may, in some instances, create additional (or different) issues.

The 2-step RACH may require a significant amount of physical channel resources for transmitting what is normally denoted "Msg1+3" (that is, a message including preamble, IMSI, RRC connection establishment cause, etc.). The Msg1+3 may contain the information normally contained in the Msg1 (random access preamble) and Msg3 (UE 110 identity and additional information)). Different from preamble (Msg1) transmission, multiple UEs 110 transmitting Msg1+3 at the same resource may cause a collision resulting in lost reception at the gNB 170 side. This situation may be neutralized to some extent if many resources for Msg1+3 are reserved, but on the other hand, such over-reservation may cause large system overhead. If too few resources for Msg1+3 are reserved, the probability of collision may be very high.

In the scenario where too many UEs 110 perform random access simultaneously, the probability of collision becomes very high. The 2-step RACH procedure cannot work normally in that scenario, since the gNB 170 loses the usage control of those RACH resources. The back-off 4-step RACH procedure (or capability to perform the back-off 4-step RACH procedure) may be necessary, or required by the example embodiments (for example, as a failsafe in instances in which too many UEs 110 perform random access simultaneously).

The 4-step RACH procedure has been used in LTE and Rel-15 NR. The details of the 4-step RACH are shown as follows.

At block 210, gNB 170 may broadcast the configuration of preamble (Msg1) in RMSI. The UE 110 obtains the configuration by receiving SSB and corresponding RMSI.

At block 220 (step 1), UE 110 may randomly select a preamble from a configured set and transmit this random access preamble (Msg1) to the gNB 170 based on the configuration (for example, configured time and frequency resources).

At block 230 (step 2), gNB 170 may receive the preamble and respond with random access response (RAR) (Msg2).

At block 240 (step 3), UE may obtain the RAR and transmit Msg3 based on the UL grant in the RAR.

At block 250 (step 4), gNB 170 may receive Msg3 and sends Msg4 to finish contention resolution.

Since Msg3 is transmitted based on an UL grant, the gNB 170 has the possibility of scheduling a retransmission request through a new UL grant indicating that the UE 110 should attempt a retransmission. If any one of steps 2-4 fails due to LBT, there is a risk that the UE 110 has to re-transmit preamble again, for example, go to block 210 (step 1) or that the UE 110 has to wait longer for messages from the gNB 170. That is, accepting higher latency for the procedure to complete.

FIG. 3 is an example flow diagram 300 illustrating a method in accordance with example embodiments which may be performed by an apparatus, or combination of apparatus, for example, a gNB 170 and UE 110 as described herein.

At block 310, gNB 170 may broadcast the configuration of Msg1+3 (including legacy Msg1 and Msg3) in RMSI. The UE 110 may obtain the configuration by receiving SSB and corresponding RMSI.

At block 320 (step 1), UE 110 may send Msg1+3 to the gNB 170 based on the configuration.

At block 330 (step 2), gNB 170 may receive Msg1+3 and responds with Msg2+4 (corresponding to a combination of Msg2 and Msg4, but not including the UL grant in Msg2) if it decodes Msg1+3 successfully.

It should be noted that the protection of HARQ for Msg3 transmission is potentially non-existing, and if step 2 fails, the UE 110 has to re-transmit preamble again, for example, go to step 1, or the UE 110 switches to the 4-step RACH procedure as described above with respect to FIG. 2.

The example embodiments provide gNB 170 control of the collision probability on the allocated resources, and conditions that allow the UE 110 to use the secondary set of RACH resources (the 2-step RACH resources). For example, in particular embodiments, 2-step RACH procedure is only used when UE 110 is doing RRC connection re-establishment, or alternatively when instant small data payload is transmitted without established RRC connection; or 2-step RACH procedure is only valid within the timer duration configured for a UE 110 by gNB 170; or the configurations by gNB 170 is only applicable to a specific (set of) cell(s); or when UE 110 has traffic for scheduling on specific logical channels or logical channel groups.

The example embodiments overcome the disadvantage of the 2-step RACH (large message size and high collision) and take the advantage of it (fast access), in particular refraining from using (restricting) 2-step size RACH during initial access (and instead using 4-step RACH procedure during initial access), but using the 2-step RACH procedure (for example, as described with respect to FIG. 3) in response to particular triggers, for example, during RRC connection re-establishment. The example embodiments may have gNB 170 control the collision probability by determining how many UEs 110 can use 2-step RACH procedure and for how long a duration the UEs 110 may use the 2-step RACH procedure, and configure UE 110 with such configurations via RRC signalling.

FIG. 4 is an example flow diagram 400 illustrating a method in accordance with example embodiments which may be performed by an apparatus, or combination of apparatus, for example, a gNB 170 and UE 110 as described herein.

The example embodiments provide a gNB 170 controlled approach for a hybrid RACH procedure, which may combine the advantage of both the 4-step RACH procedure (as described with respect to FIGS. 2) and 2-step RACH procedure (as described with respect to FIG. 3), while at the same time providing the gNB 170 control of the amount of resources allocated to a selected subset of UEs 110. The example embodiments provide a mechanism for gNB 170 control of which UEs 110 may use 2-step RACH procedure, while at the same time allowing the gNB 170 (for example, some) control of the collision probability on the allocated resources.

At block 410 (step 1), during initial access, all UEs 110 may use the 4-step RACH procedure (as described above with respect to FIG. 2).

At block 420 (step 2), gNB 170 and UE 110 may (for example, upon re-establishing the RRC connection) determine that the UE 110 is eligible for low latency access to the cell. According to an example embodiment, this determination (gNB 170 and UE 110 determining that UE 110 is eligible for low latency access to the cell) should be established prior to the UE 110 exiting the RRC connected mode (that is, before entering IDLE mode or RRC INACTIVE mode). In further example embodiments, other modes may be implemented, for example, radio link recovery or device timing recovery may also be part of the mechanisms.

The request (for access) may come from the UE 110 side (for example, RRC or MAC based request from UE 110). The gNB 170 may decide to assign UE 110 to low latency access due to traffic class. The gNB 170 may receive configuration from core network to assign UE 110 for low latency access.

At block 430 (step 3), gNB 170 may provide a configuration to the UE 110 for using 2-step RACH for either RRC connection re-establishment or instant small data payload transmission without established RRC connection which contains one or more of the following: a) Configuration of resources to use; b) Associated preamble set to use; c) Associated user connection ID; d) Power ramping rules for Msg1 and Msg3 transmissions (may have different rules for the power ramping); e) Configuration of a set of cells that have this configuration available. The configuration may be provided separately for each cell; f) Configuration of an amount of time that the resources are reserved for this UE 110; g) Association of which logical channels or logical channel groups are allowed to trigger a 2-step RACH procedure (if needed); h) The gNB 170 may provide configurations via UE-specific higher layer signalling (for example, RRC signalling or MAC signalling or a combination of the two).

Configuration of resources to use (it should be noted that the parameters for 2-step RACH may be separate resources or partly overlapping with existing resources for 4-step RACH). With regard to the resources: i) The resources may be in time domain (defined as a pattern, periodicity or other way of indicating time-wise allocation of resources), ii) The resources may be in the frequency domain (like specific PRBs to use, selected interlaces to use, etc.). iii) The resources may be in the code domain (like OCC, cyclic shift, etc.). iv) There may be separate configurations for Msg1 and Msg3 transmissions.

With regard to c) Associated user connection ID, this may be (for example, in the form of RNTI) used when accessing the cell when using 2-step RACH resources. Such user connection ID may be needed if the UE 110 has lost the RRC connection to the cell.

With regard to f) Configuration of an amount of time that the resources are reserved for this UE 110, the configuration of time availability may be depending on either absolute time or relative time (for instance as an elapsed time after last connection, elapsed time after RRC release signalling, elapsed time after the configuration was received, elapsed time since the configuration was renewed, etc.).

The gNB 170 may have a possibility (for example, a capability) for indicating extension of time resources for configured UEs 110 via system broadcast signalling.

At block 440 (step 4), UE 110 may, based upon detection of a predetermined trigger provided by the gNB 170 (for example, upon losing the connection to the gNB 170), perform 2-step RACH procedure based on configurations provided by the gNB 170 in case the UE 110 has traffic arriving for the associated logical channel or logical channel groups, or it receives paging from the gNB 170. The gNB 170 may configure a set of triggers that allow for use the configured 2-step RACH resources. The triggers for the 2-step RACH resources may include traffic for logical channels. Other triggers may include "PDCCH Order" or "paging message". A PDCCH order is a special command that is used to indicate from the gNB 170 to the UE 110 that a RACH procedure should be initiated. This procedure is used for UEs that are in RRC connected mode, but does no longer have a suitable timing relation between the UE 110 and the gNB 170. The definition of suitable timing relation is derived based on the time elapsed since the UE 110 and the gNB 170 last had an exchange of messages on the physical layer. A "paging message" is a signal that is broadcast from the gNB 170 to the entire cell. The paging message contains an indication that a UE 110 should establish connection to gNB 170. The indication is normally based on a unique identification of the UE 110, for instance through the IMSI (International Mobile Subscriber Identity). Such paging message is normally used to establish connection between the gNB 170 and the UE 110 when the UE 110 is in either IDLE mode or RRC INACTIVE mode.

At block 450 (step 5), UE 110 may default to normal 4-step RACH procedure based on predetermined triggers for defaulting to 4-step RACH procedure, for example, in case it has traffic arriving that is not in the configured set of logical channels or logical channel groups.

Depending on the resources allocated in block 430 (step 3), the gNB 170 may have configured the selected UEs 110 such that there is contention free access during step 4 (block 440), and the UE 110 may have access to the gNB 170 (or a set of gNBs 170) that allows for shorter access time.

In example embodiments, targeted UEs 110 may not be associated to the serving cell, and the example embodiments may be applied to the random access procedure.

FIG. 5 is an example flow diagram 500 illustrating a method in accordance with example embodiments which may be performed by an apparatus.

The example as described with respect to FIG. 5 may provide a capability for a device (for example, UE110) to have access to multiple ways of performing random access procedure.

At block 510, gNB 170 may configure, through broadcast signaling, UE 110 with a first way (for example, mode) of performing random access procedure.

At block 520, gNB 170 may configure, through device specific signaling, UE 110 with a second way (for example, mode) of performing random access procedure.

At block 530, gNB 170 may limit an availability of the second mode of performing random access procedure. The limiting may consist of (the second way of performing random access procedure) only being available a duration of time after last connection to connected cell. The limiting may consist of only being applicable to a specific (set of) cell(s). The limiting may consist of a device having traffic for scheduling on specific logical channels or logical channel groups.

Without in any way limiting the scope, interpretation, or application of the claims appearing below, a technical effect of one or more of the example embodiments disclosed herein is to provide a mechanism for gNB 170 control of which UEs 110 may use 2-step RACH procedure, while at the same time allowing the gNB 170 some control of the collision probability on the allocated resources.

An example embodiment may provide a method comprising configuring, by a base station, a device with a first mode of performing random access procedure; configuring the device with a second mode of performing random access procedure, wherein the device is configured to access either the first mode of performing random access procedure or the second mode of performing random access procedure; and configuring an availability of the second mode of performing random access procedure.

In accordance with the example embodiments as described in the paragraphs above, wherein the first mode of performing random access procedure comprises a 4-step RACH procedure.

In accordance with the example embodiments as described in the paragraphs above, wherein the second mode of performing random access procedure comprises a 2-step RACH procedure.

In accordance with the example embodiments as described in the paragraphs above, wherein configuring the availability of the second mode of performing random access procedure further comprises configuring the second mode of performing random access procedure available for a predetermined duration of time after last connection to a connected cell.

In accordance with the example embodiments as described in the paragraphs above, wherein configuring the availability of the second mode of performing random access procedure further comprises configuring the device with a predetermined duration of time that at least one resource is available for the device.

In accordance with the example embodiments as described in the paragraphs above, wherein configuring the availability of the second mode of performing random access procedure further comprises configuring the second mode of performing random access procedure applicable to at least one specific cell.

In accordance with the example embodiments as described in the paragraphs above, wherein configuring the availability of the second mode of performing random access procedure further comprises scheduling traffic on at least one of a specific logical channel or a logical channel group.

In accordance with the example embodiments as described in the paragraphs above, wherein configuring the availability of the second mode of performing random access procedure further comprises configuring the availability of the second mode based on a collision probability on at least one allocated resource.

In accordance with the example embodiments as described in the paragraphs above, receiving a request for configuration from the device via at least one of radio resource control signalling and media access control signalling.

In accordance with the example embodiments as described in the paragraphs above, wherein configuring the device with the second mode of performing random access procedure further comprises: providing an associated user connection identifier to use when accessing the base station using resources associated with the second mode of performing random access procedure.

In accordance with the example embodiments as described in the paragraphs above, wherein configuring the device with the first mode of performing random access procedure further comprises configuring the device through broadcast signaling.

In accordance with the example embodiments as described in the paragraphs above, wherein configuring the device with the second mode of performing random access procedure further comprises configuring the device through device specific signalling.

An example embodiment may be provided in an apparatus comprising means for configuring a device with a first mode of performing random access procedure; means for configuring the device with a second mode of performing random access procedure, wherein the device is configured to access either the first mode of performing random access procedure or the second mode of performing random access procedure; and means for configuring an availability of the second mode of performing random access procedure.

In accordance with the example embodiments as described in the paragraphs above, wherein the first mode of performing random access procedure comprises a 4-step RACH procedure.

In accordance with the example embodiments as described in the paragraphs above, wherein the second mode of performing random access procedure comprises a 2-step RACH procedure.

In accordance with the example embodiments as described in the paragraphs above, wherein the means for configuring the availability of the second mode of performing random access procedure further comprises means for making the second mode of performing random access procedure only available for a predetermined duration of time after last connection to a connected cell.

In accordance with the example embodiments as described in the paragraphs above, wherein the means for configuring the availability of the second mode of performing random access procedure further comprises means for making the second mode of performing random access procedure applicable to only at least one specific cell.

In accordance with the example embodiments as described in the paragraphs above, wherein the means for configuring the availability of the second mode of performing random access procedure further comprises means for scheduling traffic on at least one of a specific logical channel or a logical channel group.

In accordance with the example embodiments as described in the paragraphs above, wherein the means for configuring the device with a first mode of performing random access procedure further comprises means for configuring the device through broadcast signalling.

An example embodiment may provide a method comprising receiving, at a device, configuration of a first mode of performing random access procedure from a base station; receiving configuration of second mode of performing random access procedure, wherein the device is configured to access either the first mode of performing random access procedure or the second mode of performing random access procedure; and receiving configuration of an availability of the second mode of performing random access procedure.

In accordance with the example embodiments as described in the paragraphs above, wherein the first mode of performing random access procedure comprises a 4-step RACH procedure.

In accordance with the example embodiments as described in the paragraphs above, wherein the second mode of performing random access procedure comprises a 2-step RACH procedure.

In accordance with the example embodiments as described in the paragraphs above, wherein receiving configuration of the availability of the second mode of performing random access procedure further comprises receiving configuration of the second mode of performing random access procedure to be available for a predetermined duration of time after last connection to a connected cell.

In accordance with the example embodiments as described in the paragraphs above, wherein receiving configuration of the availability of the second mode of performing random access procedure further comprises configuring the device with a predetermined duration of time that at least one resource is available for the device.

In accordance with the example embodiments as described in the paragraphs above, wherein receiving configuration of the availability of the second mode of performing random access procedure further comprises configuring the second mode of performing random access procedure applicable to at least one specific cell.

In accordance with the example embodiments as described in the paragraphs above, wherein receiving configuration of the availability of the second mode of performing random access procedure further comprises scheduling traffic on at least one of a specific logical channel or a logical channel group.

In accordance with the example embodiments as described in the paragraphs above, wherein receiving configuration of the availability of the second mode of performing random access procedure further comprises configuring the availability of the second mode based on a collision probability on at least one allocated resource.

In accordance with the example embodiments as described in the paragraphs above, wherein receiving configuration of, through device specific signaling, the device with the second mode of performing random access procedure further comprises receiving configuration of resources for the device to use from at least one of time domain resources, frequency domain resources and code domain resources.

An example embodiment may be provided in an apparatus comprising means for receiving, at a device, configuration of a first mode of performing random access procedure from a base station; means for receiving configuration of second mode of performing random access procedure, wherein the device is configured to access either the first mode of performing random access procedure or the second mode of performing random access procedure; and means for configuring an availability of the second mode of performing random access procedure.

An example embodiment may be provided in an apparatus comprising at least one processor; and at least one non-transitory memory including computer program code, the at least one memory and the computer program code may be configured to, with the at least one processor, cause the apparatus to: configure a device with a first mode of performing random access procedure; configure the device with a second mode of performing random access procedure, wherein the device is configured to access either the first mode of performing random access procedure or the second mode of performing random access procedure; and control an availability of the second mode of performing random access procedure.

An example embodiment may be provided in an apparatus comprising at least one processor; and at least one non-transitory memory including computer program code, the at least one memory and the computer program code may be configured to, with the at least one processor, cause the apparatus to: perform: receive configuration of a first mode of performing random access procedure from a base station; receive configuration of a second mode of performing random access procedure, wherein the apparatus is configured to access either the first mode of performing random access procedure or the second mode of performing random access procedure; and control an availability of the second mode of performing random access procedure.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprises:
   at least one processor; and
   at least one memory including computer program code, the at least one memory and the computer program code are configured to, with the at least one processor, cause the apparatus to:
   configure a device with a first mode of performing a random access procedure;
   configure the device with a second mode of performing the random access procedure, wherein the device is configured to access either the first mode of performing the random access procedure or the second mode of performing the random access procedure; and
   configure an availability of the first mode and the second mode of performing the random access procedure,
   wherein the configuration of the availability of the first mode and the second mode of performing the random access procedure triggers performing the random access procedure using only the second mode.

2. The apparatus of claim 1, wherein the first mode of performing the random access procedure comprises a 4-step RACH procedure, and the second mode of performing the random access procedure comprises a 2-step RACH procedure.

3. The apparatus according to claim 1, wherein configuring the availability of the second mode of performing the random access procedure comprises one of:
   configure the second mode of performing the random access procedure available for a predetermined duration of time after last connection to a connected cell;

configure the device with a predetermined duration of time that at least one resource is available for the device;

configure the second mode of performing the random access procedure applicable to at least one specific cell; or configure the availability of the second mode based on a collision probability on at least one allocated resource.

4. The apparatus according to claim 1, wherein the at least one memory and computer program code are further configured to, with the at least one processor, cause the apparatus at least to:

schedule traffic on at least one of a specific logical channel or a logical channel group.

5. The apparatus according to claim 1, wherein the at least one memory and computer program code are further configured to, with the at least one processor, cause the apparatus at least to:

receive a request for configuration from the device via at least one of radio resource control signalling and media access control signalling.

6. The apparatus according to claim 1, wherein the at least one memory and computer program code are further configured to, with the at least one processor, cause the apparatus at least to:

provide an associated user connection identifier to use when accessing the base station using resources associated with the second mode of performing the random access procedure.

7. The apparatus according to claim 1, wherein the at least one memory and computer program code are further configured to, with the at least one processor, cause the apparatus at least to:

configure resources for the device to use from at least one of time domain resources, frequency domain resources and code domain resources.

8. The apparatus according to claim 1, wherein the at least one memory and computer program code are further configured to, with the at least one processor, cause the apparatus at least to:

configure the device with the first mode of performing the random access procedure through broadcast signaling; and configure the device with the second mode of performing the random access procedure through device specific signaling.

9. An apparatus comprises:

at least one processor; and at least one memory including computer program code, the at least one memory and the computer program code are configured to, with the at least one processor, cause the apparatus to:

receive configuration of a first mode of performing a random access procedure from a base station;

receive configuration of a second mode of performing the random access procedure from the base station, wherein the apparatus is configured to access either the first mode of performing the random access procedure or the second mode of performing the random access procedure; and receive configuration of an availability of the first mode and the second mode of performing the random access procedure, wherein the configuration of the availability of the first mode and the second mode of performing the random access procedure triggers performing the random access procedure using only the second mode.

10. The apparatus of claim 9, wherein the first mode of performing the random access procedure comprises a 4-step RACH procedure, and the second mode of performing the random access procedure comprises a 2-step RACH procedure.

11. The apparatus according to claim 9, wherein the at least one memory and computer program code are further configured to, with the at least one processor, cause the apparatus at least to:

receive the configuration of the second mode of performing the random access procedure to be available for a predetermined duration of time after last connection to a connected cell.

12. The apparatus according to claim 9, wherein the at least one memory and computer program code are further configured to, with the at least one processor, cause the apparatus at least to:

receive the configuration of the device with a predetermined duration of time that at least one resource is available for the device.

13. The apparatus according to claim 9, wherein the at least one memory and computer program code are further configured to, with the at least one processor, cause the apparatus at least to:

receive the configuration of the second mode of performing the random access procedure applicable to at least one specific cell.

14. The apparatus according to claim 9, wherein the at least one memory and computer program code are further configured to, with the at least one processor, cause the apparatus at least to:

receive the configuration of the availability of the second mode based on a collision probability on at least one allocated resource.

15. The apparatus according to claim 9, wherein the at least one memory and computer program code are further configured to, with the at least one processor, cause the apparatus at least to:

receive scheduling traffic on at least one of a specific logical channel or a logical channel group.

16. The apparatus according to claim 9, wherein the at least one memory and computer program code are further configured to, with the at least one processor, cause the apparatus at least to:

receive configuration of resources for the device to use from at least one of time domain resources, frequency domain resources and code domain resources, through device specific signaling.

17. A method comprising:

receiving, at a device, configuration of a first mode of performing a random access procedure from a base station; and receiving, at the device, configuration of a second mode of performing the random access procedure from the base station, wherein the device is configured to access either the first mode of performing the random access procedure or the second mode of performing the random access procedure, and wherein the configuration of the second mode of performing the random access procedure comprises configuration of an availability of the first mode and the second mode of performing the random access procedure, and wherein the configuration of the availability of the first mode and the second mode of performing the random access procedure triggers performing the random access procedure using only the second mode.

18. The method according to claim 17, wherein the first mode of performing the random access procedure comprises a 4-step RACH procedure, and the second mode of performing the random access procedure comprises a 2-step RACH procedure.

19. The method according to claim 17, wherein the receiving the configuration of the availability of the second mode of performing the random access procedure further comprises one of:
- receiving the configuration of the second mode of performing the random access procedure to be available for a predetermined duration of time after last connection to a connected cell;
- receiving the configuration of the device with a predetermined duration of time that at least one resource is available for the device;
- receiving the configuration of the second mode of performing random access procedure applicable to at least one specific cell; or
- receiving the configuration of the availability of the second mode based on a collision probability on at least one allocated resource.

20. The method according to claim 17, wherein the receiving the configuration of, through device specific signaling, the device with the second mode of performing random access procedure further comprises:
- receiving configuration of resources for the device to use from at least one of time domain resources, frequency domain resources and code domain resources.

* * * * *